(12) United States Patent
Inoue et al.

(10) Patent No.: US 8,134,788 B2
(45) Date of Patent: Mar. 13, 2012

(54) HYBRID OPTICAL ELEMENT

(75) Inventors: Kenji Inoue, Hyogo (JP); Junpei Sasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/023,236

(22) Filed: Feb. 8, 2011

(65) Prior Publication Data

US 2011/0194187 A1  Aug. 11, 2011

(30) Foreign Application Priority Data

Feb. 9, 2010 (JP) .................................. 2010-026171
Jan. 14, 2011 (JP) .................................. 2011-005702

(51) Int. Cl.
*G02B 9/00* (2006.01)
*G02B 3/08* (2006.01)

(52) U.S. Cl. ........................................ 359/796; 359/741
(58) Field of Classification Search .................. 359/741, 359/796

See application file for complete search history.

(56) References Cited

FOREIGN PATENT DOCUMENTS

JP  05254862 A  * 10/1993
JP  7-164453  6/1995

* cited by examiner

*Primary Examiner* — William Choi
(74) *Attorney, Agent, or Firm* — Hamre, Schumann, Mueller & Larson, P.C.

(57) ABSTRACT

A hybrid optical element includes: a glass substrate having a first optically functional surface and a second optically functional surface; and a resin layer bonded to the second optically functional surface. The glass substrate further has an outer peripheral surface provided around the first optically functional surface. The outer peripheral surface has a surface roughness Ra of at least 1 μm but not more than 20 μm.

6 Claims, 3 Drawing Sheets

PRIOR ART

PRIOR ART

HYBRID OPTICAL ELEMENT

BACKGROUND OF THE INVENTION

1. Field of the Invention

The present invention relates to a hybrid optical element in which a resin layer is bonded to a surface of a glass substrate.

2. Description of Related Art

As a hybrid optical element having a configuration in which a resin layer is bonded to a surface of a glass substrate, there is so called a hybrid lens in which a spherical-lens-like glass is used as a substrate, and the spherical surface of the glass is covered with a resin while a surface of the resin is formed aspherical (see JP 7 (1995)-164453 A, for example).

SUMMARY OF THE INVENTION

The method for manufacturing the hybrid optical element will be described. The hybrid optical element is manufactured by placing a resin material between a glass substrate and a molding die, shining light on the resin material to cure it and form a resin layer, and releasing the glass substrate and the resin layer from the molding die after the curing.

A reversal shape of a lens shape designed as desired is formed in the molding die. The shape of the molding die is transferred to the resin, so that the resin surface is formed into the desired lens shape.

However, there occurred a problem in that a nonuniform error is generated between the shape of the resin after the curing process and the shape of the molding die. That is, the shape error is small at one part but large at another part in the resin layer. The present inventors have found that this problem is caused by the shape of the glass substrate.

FIG. 4 is a schematic cross-sectional view showing a resin curing process for a conventional hybrid optical element 300. A reversal shape of a lens shape designed as desired is formed in an upper surface of a molding die 33. A liquid resin material is applied onto the molding die 33, and a glass substrate 31 is lowered down thereon and positioned so that the space between the glass substrate 31 and the molding die 33 is a specified lens thickness.

In the figure, light 34 with a wavelength that allows the resin material to undergo a polymerization reaction is shined on the resin material from above as almost parallel fluxes of light beams so as to cure the resin material and form a resin layer 32. After the resin material is cured, the integral glass substrate 31 and the resin layer 32 are released from the molding die 33. Thus, the hybrid optical element 300 is obtained.

Generally, a resin material shrinks due to curing as its polymerization reaction proceeds. That is, a shape error is generated between the surface shape of the cured resin layer 32 and the surface shape of the molding die 33. For the sake of explanation, in the case where the difference between the shape error at one part and the shape error at another part in the vicinity thereof in the resin layer 32 is small, it is referred to as a "gentle shape error" in this description. In the case where the difference is large, it is referred to as a "steep shape error".

When the surface shape of the resin layer 32 is measured after it is released from the die, shape errors caused by the curing-shrinking phenomenon of the resin are detected over the entire surface. When the shape errors are the gentle shape errors, the shape of the molding die 33 is corrected so as to take measures to achieve a satisfactory shape accuracy easily. However, it is difficult to take such measures only by correcting the shape of the molding die 33 because the steep shape error is generated near an outer periphery of the resin layer 32. The mechanism that causes the steep shape error near the outer periphery of the resin layer 32 will be described below.

FIG. 5 is an enlarged schematic cross-sectional view near the outer peripheries of the glass substrate 31, the resin layer 32, and the molding die 33 shown in FIG. 4. The glass substrate 31 has: a first optically functional surface 311; an outer peripheral surface that is composed of a flat surface 312 and a slope 313 and provided around the first optically functional surface 311 and; a side surface 314; and a second optically functional surface 315. The first and second optically functional surfaces each are a surface through which effective light to be used is transmitted when the hybrid optical element is embedded later in an optical apparatus, such as a camera.

The light 34 for curing the resin material to form the resin layer 32 is incident on the first optically functional surface 311 and then refracted, and proceeds in a direction toward the outside, and is shined on the resin material as indicated by thick line arrows. The light incident on the flat surface 312 proceeds straight almost as it is without being refracted, and is shined on the resin material. The light incident on the slope 313 is refracted and proceeds toward the inside, and is shined on the resin material. As a result, these lights gather near the outer periphery of the resin material, creating a portion at which the illuminance particularly is higher than that of a nearby portion. Accordingly, at the portion with higher illuminance, a polymerization reaction starts earlier than at the nearby portion and the resin material is cured preferentially. As a result, after the resin curing process, a ring-shape protrusion is formed in a peripheral area of the surface of the resin layer 32, causing the shape error of the resin layer 32 to be the steep shape error. The present inventors have found these facts.

Use of the method disclosed in JP 7 (1995)-164453 A may make it possible to avoid the above-mentioned phenomena. JP 7 (1995)-164453 A describes a problem that when parallel rays of light are shined over a glass substrate for manufacturing a hybrid optical element, the light is scattered by an outer peripheral surface of the glass substrate and thus a shape defect occurs at a peripheral portion of a resin layer because the outer peripheral surface of the glass substrate generally has been processed into a roughened surface. In the method disclosed in JP 7 (1995)-164453 A, in order to solve this problem, a biconcave lens for converting the parallel rays into diverging rays is disposed on the glass substrate, and the diverging rays are incident only on an optically functional surface of the glass substrate through the biconcave lens so that the light reaches the entire resin material without shining light on the outer peripheral surface of the glass substrate. However, such a method requires not only the biconcave lens but also a mask for covering the outer peripheral surface of the glass substrate, leading to high manufacturing cost.

The present invention has been accomplished to solve the above-mentioned problems. The present invention is intended to provide a hybrid optical element that can be manufactured at low cost while having a satisfactory shape accuracy.

In order to solve the aforementioned problem, the present invention provides a hybrid optical element including: a glass substrate having a first optically functional surface facing one side of an optical axis direction, a second optically functional surface facing the other side of the optical axis direction, and an outer peripheral surface provided around the first optically functional surface; and a resin layer bonded to the second optically functional surface of the glass substrate. The outer peripheral surface has a surface roughness Ra of at least 1 μm but not more than 20 μm.

As stated herein, the "surface roughness Ra" is an arithmetic average roughness measured with a surface-shape measuring apparatus using white light interferometry according to American National Standard, ASME B46.1-2002 (Surface Texture), Appendix E, sections E1.1 and E1.2. The surface roughness Ra can be measured with New View 100, manufactured by ZYGO Corp., U.S.A., for example.

The above-mentioned configuration makes it possible to obtain a hybrid optical element that can be manufactured at low cost while having a satisfactory shape accuracy.

DETAILED DESCRIPTION OF THE INVENTION

Hereinafter, embodiments of the present invention will be described with reference to the drawings.

Figure 1:
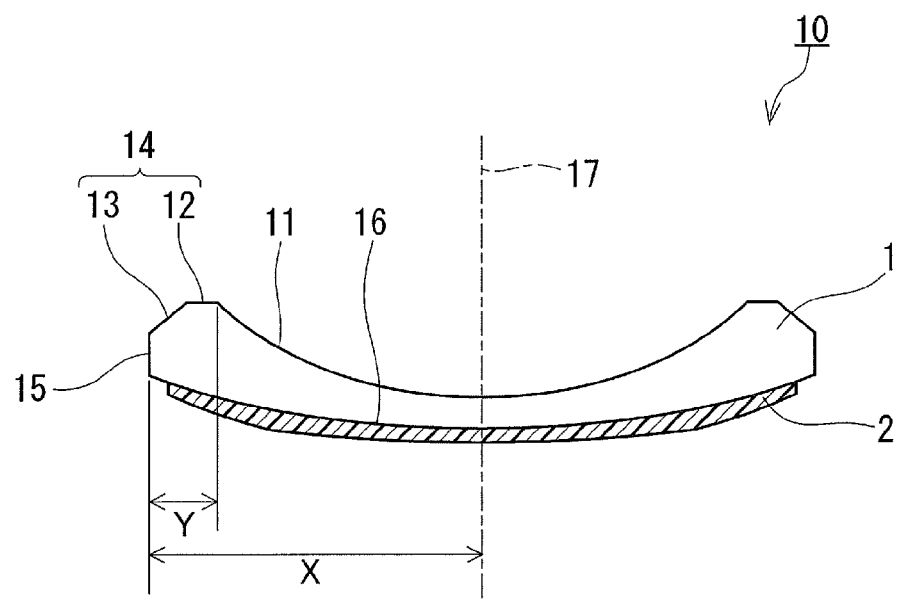
FIG. 1 is a schematic cross-sectional view showing a hybrid optical element according to one embodiment of the present invention.

FIG. 1 is a schematic cross-sectional view showing a hybrid optical element 10 according to one embodiment of the present invention. The hybrid optical element 10 includes: a glass substrate 1 having a first optically functional surface 11 and a second optically functional surface 16; and a resin layer 2 bonded to the second optically functional surface 16 of the glass substrate 1. It should be noted that another resin layer also may be bonded to the first optically functional surface 11.

The first optically functional surface 11 of the glass substrate 1 faces one side (upward in FIG. 1) of an optical axis direction (a direction in which an optical axis 17 extends). The second optically functional surface 16 faces the other side (downward in FIG. 1) of the optical axis direction. As stated herein, the term "optically functional" means to have a function to produce a required optical property. The glass substrate 1 further has: an outer peripheral surface 14 provided around the first optically functional surface 11; and a cylindrical side surface 15 facing radially outwardly. In the present embodiment, the glass substrate 1 is a meniscus-shaped lens, the first optically functional surface 11 is a concave surface, and the second optically functional surface 16 is a convex surface. The glass substrate 1 may be rotationally symmetric with respect to the optical axis 17. The first optically functional surface 11 and the second optically functional surface 16 each may be formed into a spherical surface shape.

The glass substrate 1 does not necessarily have to be rotationally symmetric with respect to the optical axis 17, and may have an elliptical shape when viewed from the optical axis direction. However, it is preferable that the glass substrate 1 have an almost circular shape when viewed from the optical axis direction. As stated herein, the term "almost circular shape" refers to a concept incorporating not only a perfect circle but also a D-shaped cut pattern and an H-shaped cut pattern that are obtained by cutting off a circular shape linearly.

The outer peripheral surface 14 has a flat surface 12 perpendicular to the optical axis 17, and a slope 13 inclined at a specified angle (30° to 75°, for example) with respect to the optical axis 17. More specifically, the flat surface 12 has an annular shape extending perpendicularly to the optical axis direction from an edge of the first optically functional surface 11. The slope 13 has a tapered shape extending from an outer edge of the flat surface to come close to the second optically functional surface while increasing a diameter of the tapered shape. An outer edge of the slope 13 joins to an edge of the second optically functional surface 16 via the side surface 15. The flat surface 12 and the slope 13 are an example of the outer peripheral surface 14. For example, the outer peripheral surface 14 may be formed only of the flat surface 12, or may be formed only of the slope 13. Or the outer peripheral surface 14 may be a curved surface, or a surface processed into a desired shape. The outer peripheral surface 14 (the flat surface 12 and the slope 13) is formed as a roughened surface having a surface roughness Ra of at least 1 μm but not more than 20 μm. With such a configuration, the hybrid optical element 10 according to the present embodiment makes it possible to reduce the occurrence of shape error in the after-mentioned manufacturing process. The surface roughness Ra of the outer peripheral surface 14 can be adjusted by selecting a grinding stone to be used for grinding the outer peripheral surface 14 at the time of manufacturing the glass substrate 1.

In the hybrid optical element 10 according to the present embodiment, when a radius of the glass substrate 1 is referred to as X and a width of the outer peripheral surface 14 is referred to as Y, a ratio Y/X of the width Y of the outer peripheral surface 14 to the radius X of the glass substrate 1 is at least 0.08 but not more than 0.4. As stated herein, the "radius of the glass substrate 1" indicates a length of a line segment from the optical axis 17 to an outer peripheral end of the glass substrate 1 in a radial direction about the optical axis 17 in the case where the glass substrate 1 has an almost circular shape when viewed from the optical axis direction. The "width of the outer peripheral surface 14" indicates a length of a line segment connecting an inner edge of the outer peripheral surface 14 to an outer edge of the outer peripheral surface 14 in the radial direction about the optical axis 17 in the case where the glass substrate 1 has an almost circular shape when viewed from the optical axis direction.

The resin layer 2 is made of an ultraviolet curable resin, for example. Generally, the surface of the resin layer 2 is an aspherical surface. Preferably, a peripheral portion of the resin layer 2 is overlapped with the outer peripheral surface 14 in the optical axis direction.

Next, the method for manufacturing the hybrid optical element 10 according to the present embodiment will be described.

Figure 2:
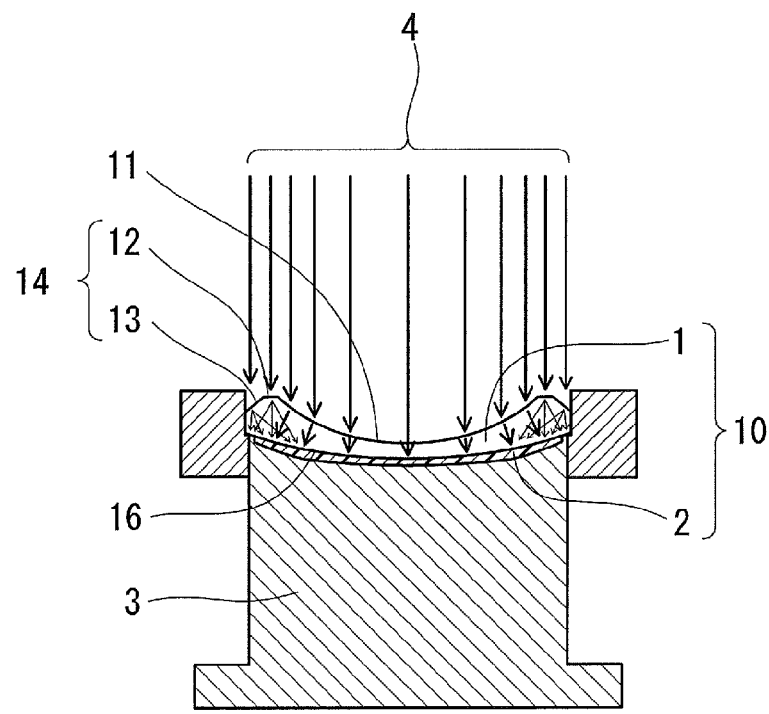
FIG. 2 is a schematic cross-sectional view showing a resin curing process for the hybrid optical element according to the one embodiment of the present invention.
Figure 3:
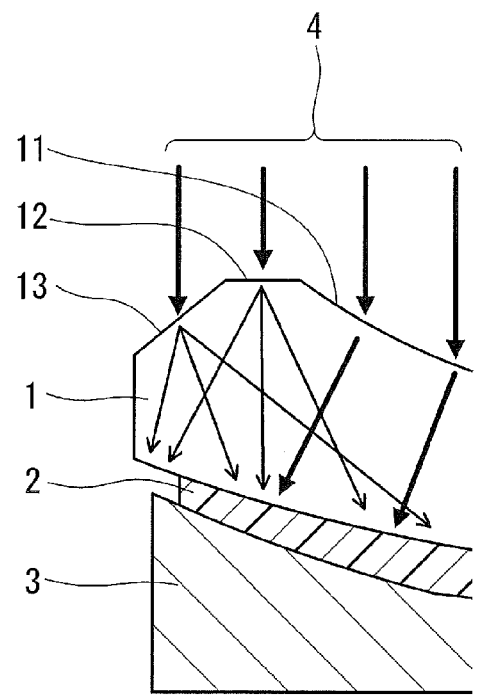
FIG. 3 is an enlarged schematic cross-sectional view near outer peripheries of a glass substrate, a resin layer, and a molding die shown in FIG. 2.
Figure 4:
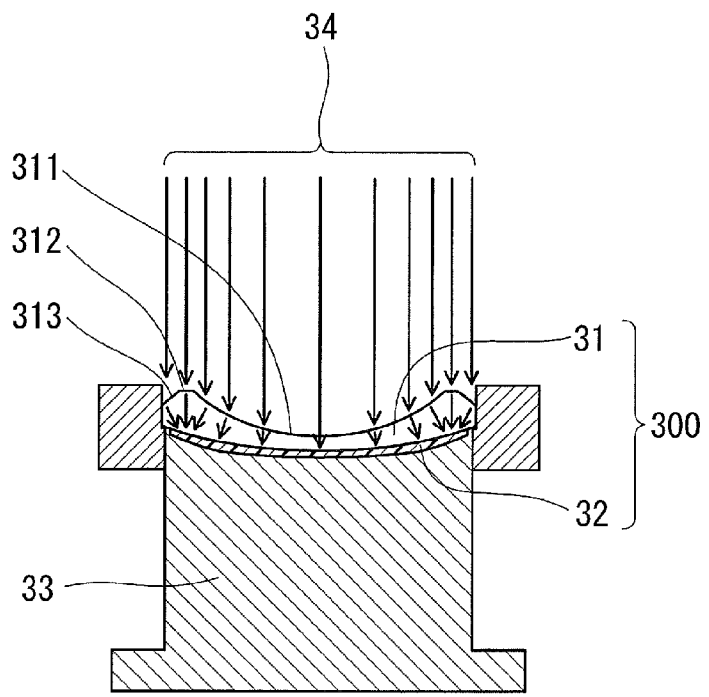
FIG. 4 is a schematic cross-sectional view showing a resin curing process for a conventional hybrid optical element.
Figure 5:
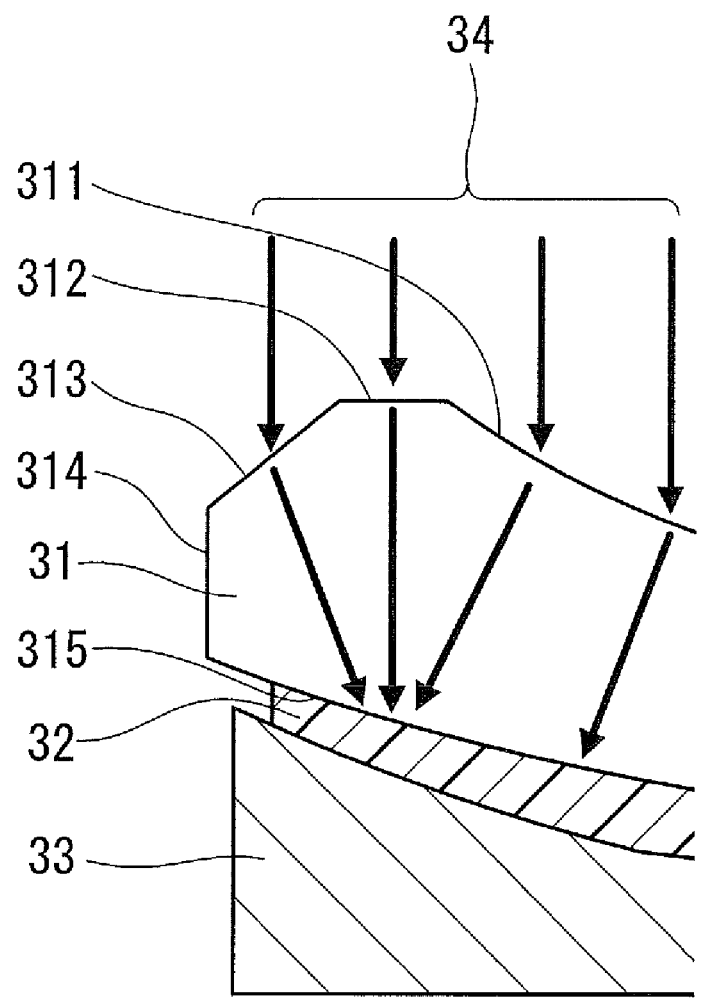
FIG. 5 is an enlarged schematic cross-sectional view near outer peripheries of a glass substrate, a resin layer, and a molding die shown in FIG. 4.

FIG. 2 is a schematic cross-sectional view showing a part of the process for manufacturing the hybrid optical element 10 according to the present embodiment. Specifically, FIG. 2 is a cross-sectional view illustrating a resin curing process. FIG. 3 is an enlarged schematic cross-sectional view near outer peripheries of the glass substrate 1, the resin layer 2, and the molding die 3 shown in FIG. 2.

The first optically functional surface 11 and the second optically functional surface 16 of the glass substrate 1 are processed into smooth and precisely-formed surfaces by grinding. The flat surface 12 and the slope 13 (the outer peripheral surface 14) are formed as roughened surfaces.

Subsequently, a liquid resin material is applied onto a molding surface of the molding die 3 with a dispenser. The molding die 3 is made of a material such as a carbide and a material obtained by applying electroless nickel plating to steel. The molding surface of the molding die 3 is formed as a concave aspherical surface. Specifically, the molding surface of the molding die 3 is formed into a reversal shape of a lens shape designed as desired.

Subsequently, the glass substrate 1 is moved above the applied resin material, and the resin material is sandwiched between the molding die 3 and the glass substrate 1. The glass substrate 1 is lowered down so as to spread the resin material over the entire molding surface. Then, the glass substrate 1 is lowered down to a position where the distance between the glass substrate 1 and the molding die 3 is a predetermined lens thickness. In this state, light 4 with a wavelength that allows the resin material to be cured is shined on the resin material from above as almost parallel fluxes of light beams. In the present embodiment, since an ultraviolet curable resin that is cured by reacting with ultraviolet rays is used as the resin material, light with a wavelength in an ultraviolet region is used as the light 4.

The light 4 incident on the flat surface 12 of the glass substrate 1 proceeds straight if the flat surface 12 is smooth. However, since the flat surface 12 is rough in the present embodiment, the light 4 is diffused to proceed not only in a downward direction from the flat surface 12 but also in various directions inside the glass substrate 1 as shown in FIG. 2 and FIG. 3. Thus, the illuminance distribution to the resin material right under the flat surface 12 is not increased abruptly and locally. Also, if the slope 13 is smooth, the light 4 incident on the slope 13 of the glass substrate 1 proceeds in a refraction angle according to Snell's law as a refracted light. However, since the slope 13 is rough in the present embodiment, the light 4 is diffused to proceed in various directions inside the glass substrate 1 as shown in FIG. 2 and FIG. 3. Thus, the illuminance distribution to the resin material is not increased locally.

For example, the illuminance of the light 4 shined from above is about 30 mW/cm², and the resin material is cured by shinning thereon the light 4 for 120 seconds to form the resin layer 2. Then, the integral glass substrate 1 and the resin layer 2 are released from the molding die 3. Thus, the hybrid optical element 10 is obtained. When the surface shape of the resin layer 2 included in the hybrid optical element 10 is measured, no ring-shape protrusion is found near the outer periphery. Accordingly, a smooth and satisfactory lens shape is obtained.

As described above, in the present embodiment, since the outer peripheral surface 14 has a surface roughness Ra of at least 1 μm but not more than 20 μm, the light incident on the outer peripheral surface 14 is diffused in various directions and propagated inside the glass substrate 1. Thereby, the light to be shined on the resin material is distributed over a large area without being concentrated locally. Accordingly, the illuminance distribution of the light shined on the resin material does not increase abruptly depending on the location but varies slowly. As a result, the curing reaction of the resin material does not differ abruptly at different locations, and no steep protrusion is generated on the surface of the cured resin layer 2. Thus, the hybrid optical element 10 has a satisfactory shape accuracy. When the surface roughness Ra of the outer peripheral surface 14 is less than 1 μm, the diffusion of light is reduced and the illuminance distribution becomes nonuniform as before, generating a steep protrusion on the surface of the resin layer 2. Moreover, since the surface roughness Ra of the outer peripheral surface 14 is 20 μm or less, the light 4 is not diffused excessively by the outer peripheral surface 14. When the surface roughness Ra of the outer peripheral surface 14 is more than 20 μm, the diffusion of the light 4 incident on the outer peripheral surface 14 becomes excessive and the transmittance is lowered. As a result, the illuminance to the resin material is lowered and the curing of the resin material becomes insufficient.

In the present embodiment, the ratio Y/X of the width Y of the outer peripheral surface 14 to the radius X of the glass substrate 1 is at least 0.08 but not more than 0.4. When Y/X is less than 0.08, the area of the outer peripheral surface 14 itself becomes smaller, thereby reducing the influence of the outer peripheral surface 14 on the curing of the resin material. That is, the configuration in which the surface roughness Ra of the outer peripheral surface 14 is at least 1 μm but not more than 20 μm is more effective for the hybrid optical element in which Y/X is at least 0.08. Thus, when Y/X is at least 0.08, the effect of relaxing the illuminance distribution caused by the diffusion of light by the outer peripheral surface 14 is enhanced. Moreover, when Y/X is more than 0.4, the outer peripheral surface 14 is enlarged more than needed, causing the hybrid optical element 10 to have an excessively large outer diameter. As a result, problems occur such as reduction in size and weight of the hybrid optical element 10, and high material costs. Therefore, Y/X preferably is 0.4 or less.

Although the resin material is an ultraviolet curable resin in the present embodiment, a resin that is cured by reacting with visible light may be used. In this case, light including visible light may be shined as the light 4, regardless of the presence of ultraviolet rays.

EXAMPLES

Hereinafter, examples of the hybrid optical element 10 will be described. The present invention, however, is not limited to the following examples at all.

Example 1

In the hybrid optical element 10 according to Example 1, the glass substrate 1 had a radius of 15 mm, the flat surface 12 had a width of 1 mm, and the slope 13 had a width of 2 mm. That is, the outer peripheral surface 14 had a width of 3 mm, and the ratio Y/X of the width Y of the outer peripheral surface 14 to the radius X of the glass substrate 1 was 0.2. The angle of the slope 13 with respect to the optical axis 17 was 45°. Furthermore, the first optically functional surface 11 had a curvature radius of 20 mm, and the second optically functional surface 16 had a curvature radius of 65 mm. In the manufacture of the glass substrate 1, the outer peripheral surface 14 was ground with a medium-rough grinding stone.

The surface roughness Ra of the outer peripheral surface 14 was measured with New View 100, manufactured by ZYGO Corp., U.S.A. (having an object lens at 10 times magnification, and measurement surface area of 0.345 mm×0.259 mm) as the above-mentioned surface-shape measuring apparatus using white light interferometry. As a result, the surface roughness Ra of the outer peripheral surface 14 was 1.4 μm. More specifically, since the slope 13 provided on an outer side of the outer peripheral surface 14 has a conical shape, the value of the surface roughness Ra at the slope 13 was read after the slope 13 was displayed in a planar state by removing the cylindrical component using Cylinder Remove, which is a function of a software installed in a calculator. When measuring the flat surface 12 provided on an inner side of the outer peripheral surface 14, the value of the surface roughness Ra at the flat surface 12 was read after the flat surface 12 was displayed in a planar state by removing the inclination using Plane Remove, which is also a function of the software installed in the calculator.

As the liquid resin material, an ultraviolet curable resin containing acrylate as its main component was used. The resin material was applied onto the molding surface of the molding die 3, the glass substrate 1 was placed thereon so as to spread the resin material. As for the size, the spread resin material had a diameter of 28 mm when viewed from the optical axis direction. In this state, the light 4 with an illuminance of 30 mW/cm$^2$ was shined over the glass substrate 1 for 120 seconds to cure the resin material. Thus, the resin layer 2 was formed. Finally, the integral glass substrate 1 and the resin layer 2 were released from the molding die 3. Thus, the hybrid optical element 10 was obtained.

The surface shape of the resin layer 2 included in the hybrid optical element 10 according to Example 1 was measured. As a result, the shape accuracy was satisfactory and no problematic ring-shape protrusion was observed near the outer periphery.

Example 2

In Example 2, the hybrid optical element 10 was obtained in the same manner as in Example 1, except that the outer peripheral surface 14 was ground with a grinding stone having finer roughness than that of the grinding stone used in Example 1. The surface roughness of the outer peripheral surface 14 was measured in the same manner as in Example 1. As a result, the surface roughness Ra of the outer peripheral surface 14 was 1.1 μm.

The surface shape of the resin layer 2 included in the hybrid optical element 10 according to Example 2 was measured. As a result, the shape accuracy was satisfactory as in Example 1, and only a ring-shape protrusion with a height of about 1.0 μm, which is not a problematic level, was observed near the outer periphery.

Example 3

In Example 3, the hybrid optical element 10 was obtained in the same manner as in Example 1, except that the outer peripheral surface 14 was ground with a grinding stone having coarser roughness than that of the grinding stone used in Example 1. The surface roughness of the outer peripheral surface 14 was measured in the same manner as in Example 1. As a result, the surface roughness Ra of the outer peripheral surface 14 was 20 μm.

The surface shape of the resin layer 2 included in the hybrid optical element 10 according to Example 3 was measured. As a result, the illuminance to the outer periphery of the resin layer 2 appeared decreased, but the resin material was cured sufficiently and the shape accuracy also was satisfactory. In addition, no problematic ring-shape protrusion was observed near the outer periphery.

Example 4

In Example 4, the glass substrate 1 having the outer peripheral surface 14 that is composed only of the slope 13 and does not include the flat surface 12 was used. The slope 13 had a width of 1.2 mm. That is, the ratio Y/X of the width Y of the outer peripheral surface 14 to the radius X of the glass substrate 1 was 0.08. The first optically functional surface 11 had a curvature radius of 30 mm. The hybrid optical element 10 was obtained in the same manner as in Example 1 except for these.

The surface shape of the resin layer 2 included in the hybrid optical element 10 according to Example 4 was measured. As a result, the shape accuracy was satisfactory as in Example 1 and no problematic ring-shape protrusion was observed near the outer periphery.

Example 5

In Example 5, the width of the flat surface 12 and the width of the slope 13 in Example 1 were changed to 2 mm and 4 mm, respectively. That is, the ratio Y/X of the width Y of the outer peripheral surface 14 to the radius X of the glass substrate 1 was 0.4. The curvature radius of the first optically functional surface 11 was 14 mm, and the inclination angle of the slope 13 was 60°. The hybrid optical element 10 was obtained in the same manner as in Example 1 except for these.

The surface shape of the resin layer 2 included in the hybrid optical element 10 according to Example 5 was measured. As a result, the shape accuracy was satisfactory as in Example 1 and no problematic ring-shape protrusion was observed near the outer periphery.

Moreover, in the hybrid optical element 10 of Example 5, since the ratio of the outer peripheral surface 14 was high, the area of influence of the outer peripheral surface 14 with respect to the resin layer 2 was enlarged at the time of shining ultraviolet ray. However, there was no problem with the surface shape of the resin layer 2.

Comparative Example 1

In Comparative Example 1, the hybrid optical element was obtained in the same manner as in Example 1, except that the outer peripheral surface was ground with a grinding stone having further finer roughness than that of the grinding stone used in Example 2. The surface roughness of the outer peripheral surface was measured in the same manner as in Example 1. As a result, the surface roughness Ra of the outer peripheral surface was 0.65 μm.

The surface shape of the resin layer included in the hybrid optical element according to Comparative Example 1 was measured. As a result, a large ring-shape protrusion with a height of about 3.0 μm was observed near the outer periphery.

As described above, the present invention is useful for lenses for cameras and lenses for projectors, etc.

The invention may be embodied in other forms without departing from the spirit or essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A hybrid optical element comprising:
   a glass substrate having a first optically functional surface facing one side of an optical axis direction, a second optically functional surface facing the other side of the optical axis direction, and an outer peripheral surface provided around the first optically functional surface; and
   a resin layer bonded to the second optically functional surface of the glass substrate,
   wherein the outer peripheral surface has a surface roughness Ra of at least 1 μm but not more than 20 μm.

2. The hybrid optical element according to claim 1, wherein the glass substrate has an almost circular shape when viewed from the optical axis direction, and when a radius of the glass substrate is referred to as X and a width of the outer peripheral surface is referred to as Y, a ratio Y/X of the width Y of the outer peripheral surface to the radius X of the glass substrate is at least 0.08 but not more than 0.4.

3. The hybrid optical element according to claim 1, wherein the glass substrate is a meniscus-shaped lens with the first optically functional surface being a concave surface and the second optically functional surface being a convex surface.

4. The hybrid optical element according to claim 1, wherein the outer peripheral surface includes an annular flat surface extending perpendicularly to the optical axis direction from an edge of the first optically functional surface, and a slope with a tapered shape extending from an outer edge of the flat surface to come close to the second optically functional surface while increasing a diameter of the tapered shape.

5. The hybrid optical element according to claim 1, wherein the outer peripheral surface is rougher than the first optically functional surface.

6. A hybrid optical element comprising, a glass substrate having a first optically functional surface facing one side of an optical axis direction, a second optically functional surface facing the other side of the optical axis direction, and an outer peripheral surface provided around the first optically functional surface; and a resin layer bonded to the second optically functional surface of the glass substrate, wherein the outer peripheral surface is rougher than the first optically functional surface, wherein the glass substrate has an almost circular shape when viewed from the optical axis direction, and when a radius of the glass substrate is referred to as X and a width of the outer peripheral surface is referred to as Y, a ratio Y/X of the width Y of the outer peripheral surface to the radius X of the glass substrate is at least 0.08 but not more than 0.4.

* * * * *